US008221204B2

(12) United States Patent
Svanas et al.

(10) Patent No.: US 8,221,204 B2
(45) Date of Patent: Jul. 17, 2012

(54) METHOD, APPARATUS, AND PROGRAM PRODUCT FOR CONDUCTING A GAME HAVING A SIMULATED STOCK MARKET FEATURE

(75) Inventors: Galen T. Svanas, Austin, TX (US); Steven E. Meyer, Austin, TX (US)

(73) Assignee: Multimedia Games, Inc., Austin, TX (US)

(*) Notice: Subject to any disclaimer, the term of this patent is extended or adjusted under 35 U.S.C. 154(b) by 893 days.

(21) Appl. No.: 12/129,484

(22) Filed: May 29, 2008

(65) Prior Publication Data

US 2009/0124310 A1 May 14, 2009

Related U.S. Application Data

(60) Provisional application No. 60/987,654, filed on Nov. 13, 2007.

(51) Int. Cl.
*A63F 13/00* (2006.01)
*A63F 9/24* (2006.01)

(52) U.S. Cl. ................................ 463/9; 463/16; 463/20

(58) Field of Classification Search .......... 463/9, 16–23, 463/25–31, 1, 37, 40–47, 10; 273/138.1, 273/138.2, 139, 148 B, 148 R, 459–461; 700/90–93

See application file for complete search history.

(56) References Cited

U.S. PATENT DOCUMENTS 4,363,489 A * 12/1982 Chodak et al. ................ 273/237
5,127,651 A * 7/1992 Okada ....................... 273/143 R
5,702,303 A * 12/1997 Takemoto et al. .............. 463/27
5,766,074 A * 6/1998 Cannon et al. .................. 463/16
6,211,873 B1 * 4/2001 Moyer .......................... 715/764
6,709,330 B1 * 3/2004 Klein et al. ....................... 463/9
7,040,982 B1 * 5/2006 Jarvis et al. ....................... 463/9
7,112,133 B2 * 9/2006 Lyons ............................ 463/16
7,235,011 B2 * 6/2007 Randall et al. .................. 463/25
7,711,628 B2 * 5/2010 Davie et al. ..................... 705/37
7,742,972 B2 * 6/2010 Lange et al. ..................... 705/37
7,783,552 B2 * 8/2010 Assia et al. ................. 705/36 R
2002/0069152 A1 * 6/2002 B.C et al. ........................ 705/37
2003/0060275 A1 * 3/2003 Hughs-Baird .................. 463/25
2003/0176215 A1 * 9/2003 Palmer et al. .................. 463/25
2005/0020342 A1 * 1/2005 Palmer et al. .................. 463/16
2006/0082061 A1 * 4/2006 Kertcher ....................... 273/256
2006/0205499 A1 * 9/2006 Jarvis et al. ..................... 463/30
2006/0247056 A1 * 11/2006 Luckerson ...................... 463/42
2007/0067211 A1 * 3/2007 Kaplan et al. .................. 705/10

(Continued)

*Primary Examiner* — Dmitry Suhol
*Assistant Examiner* — Jason Skaarup
(74) *Attorney, Agent, or Firm* — Nathan H. Calvert; The Culbertson Group, P.C.

(57) ABSTRACT

A gaming machine with a simulated stock market feature that provides for player selection of a simulated stock pick from among two or more options. In response to receiving an indication of a player stock pick, the game displays a first-period bonus result showing a first-period simulated stock performance of the player stock pick relative to non-selected stock picks. The game displays a mid-bonus game pick screen allowing the player to switch their stock after the initial period. The game displays a final-period bonus result showing a final-period simulated stock performance, and awards a bonus prize related to the stock performance. A preferred game simulates four time periods of stock performance, corresponding to four quarters. After all but the last period, the user may change their stock pick. One embodiment provides a graphic sequence simulating stock performance modification, or "Jacking-Up the Stock Price."

17 Claims, 13 Drawing Sheets

U.S. PATENT DOCUMENTS

| | | | | |
|---|---|---|---|---|
| 2007/0233585 | A1* | 10/2007 | Ben Simon et al. | 705/35 |
| 2008/0108423 | A1* | 5/2008 | Benbrahim et al. | 463/25 |
| 2008/0146304 | A1* | 6/2008 | Jarvis et al. | 463/9 |
| 2008/0154827 | A1* | 6/2008 | Connors | 706/46 |
| 2008/0207333 | A1* | 8/2008 | Johnson | 463/42 |
| 2009/0125453 | A1* | 5/2009 | Okamura | 705/36 R |
| 2010/0304849 | A1* | 12/2010 | Friedman | 463/25 |

* cited by examiner

METHOD, APPARATUS, AND PROGRAM PRODUCT FOR CONDUCTING A GAME HAVING A SIMULATED STOCK MARKET FEATURE

CROSS-REFERENCE TO RELATED APPLICATION

The Applicants claim the benefit, under 35 U.S.C. §119(e), of U.S. Provisional Patent Application Ser. No. 60/987,654 filed Nov. 13, 2007, and entitled "Method, Apparatus, and Program Product for Conducting a Game Having a Simulated Stock Market Feature." The entire content of this provisional application is incorporated herein by this reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights.

TECHNICAL FIELD OF THE INVENTION

The present invention relates to gaming machines and operating software and methods, and particularly to games providing a simulated stock market playing feature.

BACKGROUND OF THE INVENTION

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Video-based gaming machines may also be used to show card games or various types of competitions, such as simulated horse races, in which wagers may be placed. Game manufacturers are continuously pressed to develop new game presentations, formats, and game graphics in an attempt to provide high entertainment value for players and thereby attract and keep players.

SUMMARY OF THE INVENTION

The present invention includes a highly entertaining method of presenting games to a player. The entertainment value is achieved by presenting a game, preferably a video-based reel-type game, having a bonus mode with a simulated stock investment feature. The present invention also encompasses methods for operating a gaming machine as well as both apparatus and program products for implementing the gaming machine operation methods.

A method embodying principles of the invention may be implemented in a gaming machine using one or more display devices such as CRTs, LCDs, plasma displays, or other types of video display devices. The display device or devices are used to show graphic elements. As used in this disclosure and the accompanying claims, a gaming machine employing, performing, or embodying the present invention will be referred to generally as a gaming machine regardless of the nature of the display device arrangement used to show results to the player.

One preferred method of providing a game includes displaying a matrix of symbol locations, which is displayed by two or more reel representations each displaying one or more adjacent symbol locations. Each symbol location is for displaying a respective reel symbol. In response to a game activation, the method simulates the rotation of each reel representation to change the symbols displayed by the matrix of symbol locations. This can produce a bonus outcome, known as a bonus trigger event. In response to a bonus trigger event while the matrix of symbol locations is displayed, the method enters a stock market bonus game.

The bonus game displays a bonus game pick screen prompting player selection of a simulated stock pick from among two or more stock selection display regions. In response to receiving an indication of a player stock pick, the method displays a first-period bonus result showing a first-period simulated stock performance of the player stock pick relative to non-selected stock picks. The method displays a mid-bonus game pick screen allowing the player to switch their stock after the initial period. The method displays a final-period bonus result showing a final-period simulated stock performance, and awards a bonus prize related to the stock performance. A preferred method simulates four time periods of stock performance, corresponding to four quarters. After all but the last period, the user may change their stock pick.

One preferred apparatus according to the invention is a gaming machine including a video display device, a player interface, and a presentation controller. The presentation controller has functionality for causing the video display device to display a bonus game pick screen prompting player selection of a simulated stock pick. The presentation controller has further functionality for receiving the player stock pick choice and causing a first-period bonus result graphic showing a first-period simulated stock performance of the simulated player stock pick relative to non-selected stock picks. Next, the presentation controller causes the video display device to display a mid-bonus game pick screen allowing the player to change their stock pick if desired. The presentation controller causes simulation of the final period and awards a bonus prize related to the final period simulated stock performance. A preferred apparatus simulates four quarters of stock performance.

One preferred program product according to the invention provides a program stored on one or more computer readable media. The program product includes first display state program code executable to cause a gaming machine to operate in a first display state showing a reel-type game. The program also includes display state control program code executable to cause the gaming machine to switch from the first display state to a second display state in response to a trigger event such as a game resulting in a bonus round. The second display state program code is executable to cause the gaming machine to operate in a second display state. In this state, a simulated stock market graph area is shown, and a simulated stock price for a player stock pick is shown on the graph. The program product may also include instructions to perform one or more other functions described herein.

In various embodiments, the invention may have one or more of the following features. The bonus game may further include a stock performance "jack-up" feature that raises the stock price after some periods when the chosen stock performs poorly in the simulation. The bonus game may be implemented as a free bonus award within a single game play cycle, or may provide ability to wager within the bonus game. The bonus game may provide a display prompting the player to hold or change their stock pick during the bonus game.

These and other advantages and features of the invention will be apparent from the following description of the preferred embodiments, considered along with the accompanying drawings.

DESCRIPTION OF PREFERRED EMBODIMENTS

Figure 1:
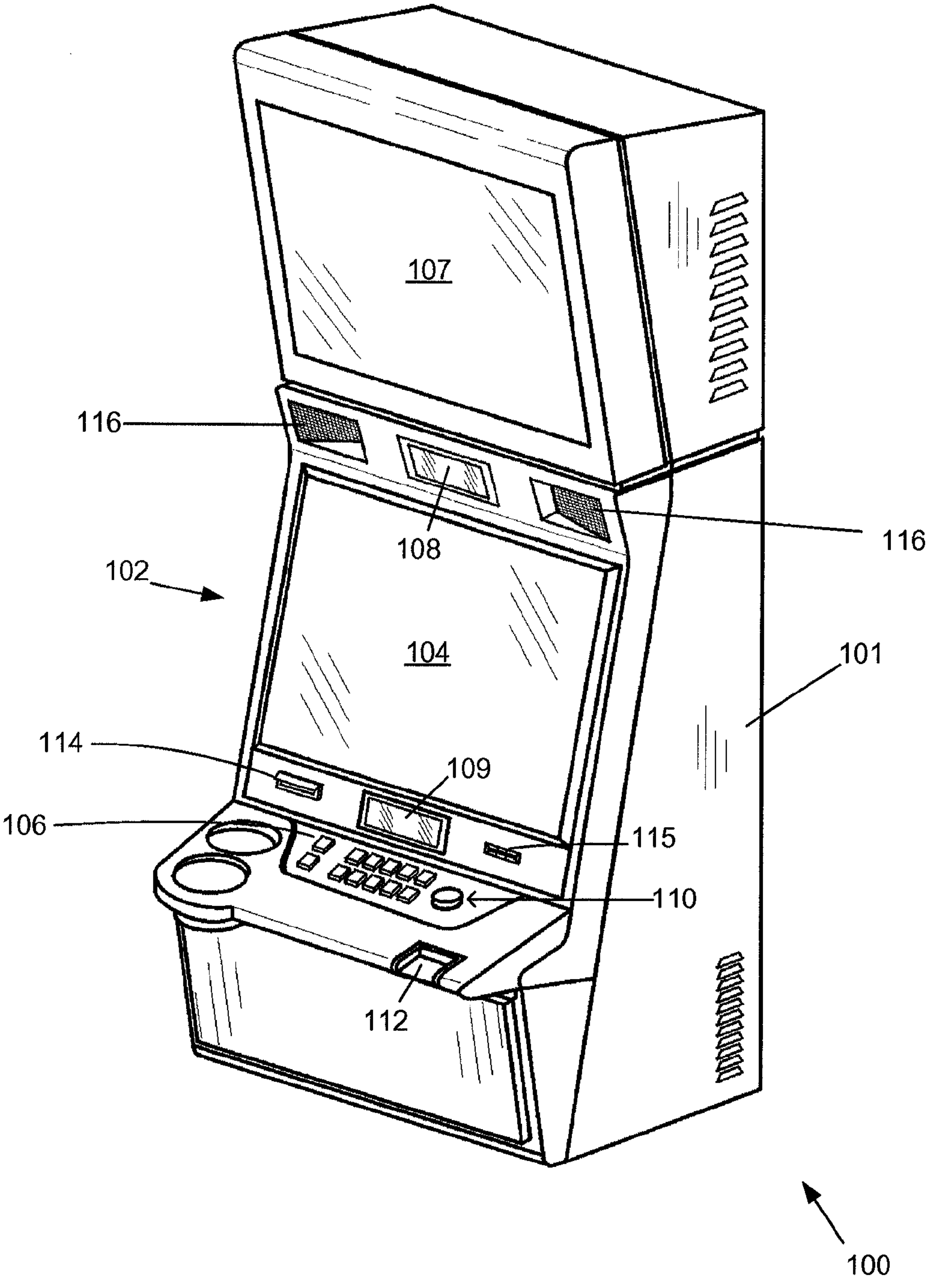
FIG. 1 is a view in front perspective of a gaming machine which may be used in a gaming system embodying the principles of the present invention.
Figure 2:
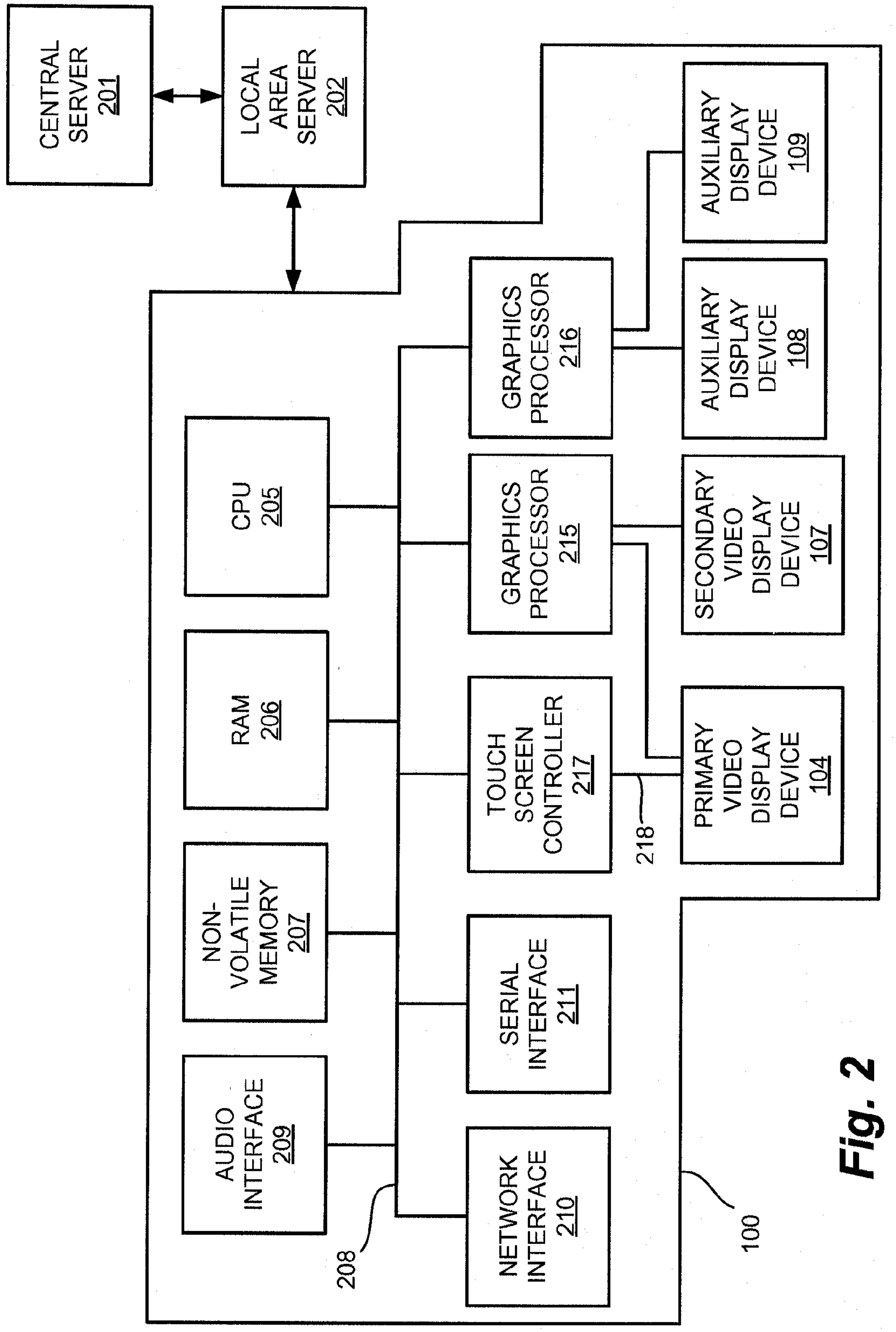
FIG. 2 is a diagrammatic representation showing various electronic components of the gaming machine shown in FIG. 1.

FIG. 1 shows a gaming machine 100 that may be used to present game results according to the present invention. The block diagram of FIG. 2 shows further details of gaming machine 100 connected in a gaming system in which the present invention may be used to present gaming results to players.

Referring to FIG. 1, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that the display devices used herein may include any suitable display device including a cathode ray tube, liquid crystal display, plasma display, LED display, or any other type of display device currently known or that may be developed in the future.

Gaming machine 100 illustrated in FIG. 1 also includes a number of mechanical control buttons 110 mounted on ledge 106. These control buttons 110 may allow a player to select a bet level, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 2 provides a block diagram showing various electronic components of gaming machine 100. In particular, FIG. 2 shows that gaming machine 100 includes a central processing unit (CPU) 205 along with random access memory (RAM) 206 and nonvolatile memory or storage device 207. All of these devices are connected on a system bus 208 with an audio interface device 209, a network interface 210, and a serial interface 211. While a single system bus is shown, of course architectures with north and south-side busses with their accompanying interface chipset(s) are also contemplated. A graphics processor 215 is also connected on bus 208 and is connected to drive the primary video display device 104 and secondary video display device 107 (both mounted on cabinet 101 as shown in FIG. 1). A second graphics processor 216 may also be connected on bus 208 to drive auxiliary display devices, such as devices 108 and 109 shown in FIG. 1, or all displays may be driven with a common graphics processor. Some embodiments may include fewer auxiliary devices. As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself includes a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements are preferably mounted on a standard personal computer chassis and housed in a standard personal computer housing which is itself mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 2 as being connected directly on system bus 208 may in fact communicate with the other system components through a suitable expansion bus. Audio interface 209, for example, may be connected to the system via a PCI bus. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display devices included with gaming machine 100. In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 alone or in combination with one or more of the depicted graphics processors may implement a presentation controller which executes display control client code for performing functions associated with a graphically presented game according to the present invention. In the preferred embodiment, processor 205 and graphics processor 215 represent the presentation controller included in the invention. As indicated previously however, the invention is not limited to a presentation controller comprising a general purpose processing device, and is not limited to a presentation controller implemented at the gaming machine 100. Rather, the functions of the presentation controller described herein may be performed at a processing device remote from the gaming machine 100. For example, local area server 202 or central server 201 shown in FIG. 2 may represent the presentation controller according to some forms of the invention. The presentation controller functions may also be split between multiple processing devices remote from the gaming machine 100, or through multiple processing devices at a single location or distributed over a network. CPU 205 also executes software related to communications handled through network interface 210, and software related to various peripheral devices such as those connected to the system through audio interface 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network interface 210 provides an interface to other components of a gaming system such as the servers discussed below in connection with FIG. 3.

Figure 3:
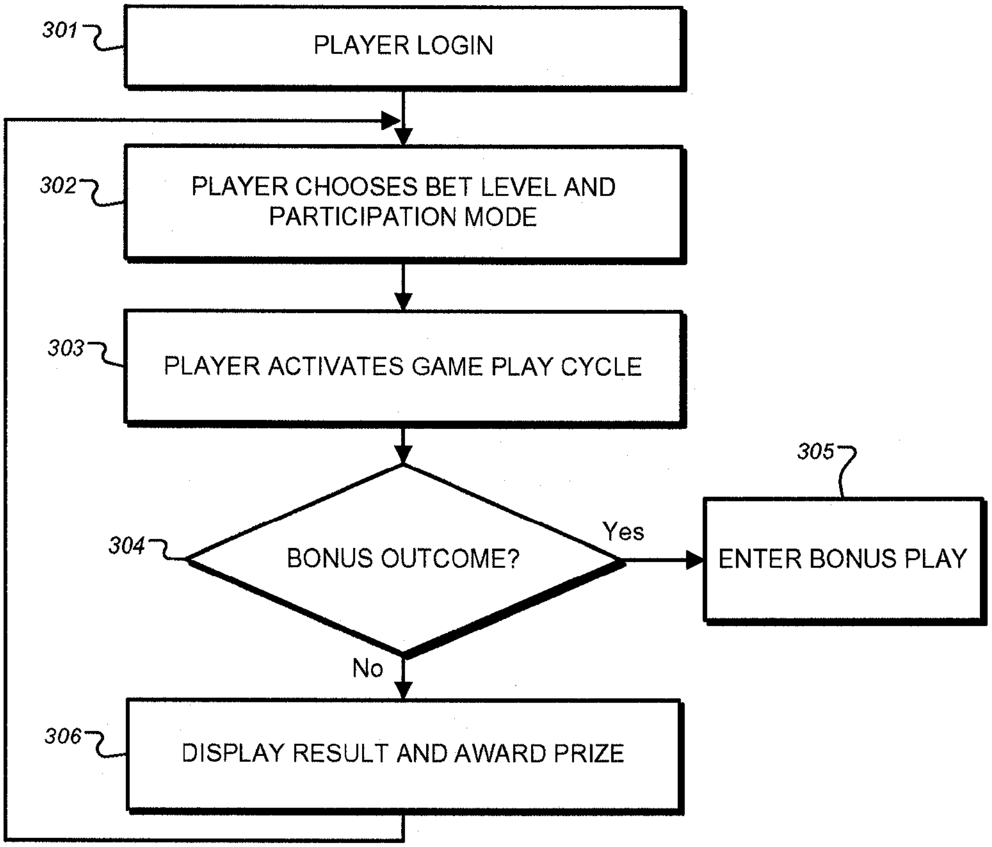
FIG. 3 is a process flow chart showing the operation of a gaming machine in a normal play mode.

FIG. 3 is a process flow chart showing the operation of a gaming machine in a normal play mode. The gaming machine may be of the type shown as gaming machine 100 in FIGS. 1 and 2, for example. The process begins with a player login as shown at process step 301 in FIG. 3. This step may include simply depositing cash or a credit in the machine 100, and may include a player's club card or player ID card login with or without accompanying authentication. The player chooses their bet level and participation mode in step 302. The bet level typically refers to the number of credits the player bets. Bet level may be assigned as a total bet, or, for games with multiple ways to win such as "bet lines," the bet level may be the number of credits per line. The participation mode refers to the level of game participation selected by the player. Most commonly this refers to the number of bet lines the player is playing. For example many common games have 20 possible bet lines, with the "max lines" participation level being 20 lines, but several lower participation levels are also selectable by the player. Other embodiments may have other participation levels which may be selected by the player, such as a bet level including a progressive bonus participation.

The process next proceeds to step 303 in which the player activates game play. This is typically done by pressing a "play" or "spin" button on gaming machine 100, or a touchscreen button. Any suitable activation sequence may be used. The player command provides a game activation which starts game play, and then the gaming machine provides a game result. This combination is referred to as a complete "game play cycle." The game play cycle will typically include some player input representing a game play request at the gaming machine to initiate a game play. This input may be entered in any suitable fashion at the gaming machine and may include one or more separate inputs. These inputs are entered at a suitable input device at the gaming machine, such as the one or more input devices 109 shown in FIG. 1 and/or a touch screen associated with a game display such as primary video display device 104 as discussed above in connection with FIG. 2. Other embodiments employ a much more streamlined input procedure for initiating a game play. For example, a given game play may be initiated by simply activating a "play" button included in player input devices such as input devices 110 in FIG. 1 and/or included in a touchscreen display. Game play may be conducted according to many schemes of providing randomly selected game results. The result is typically matched to a prize level to be awarded to the player.

Figure 6:
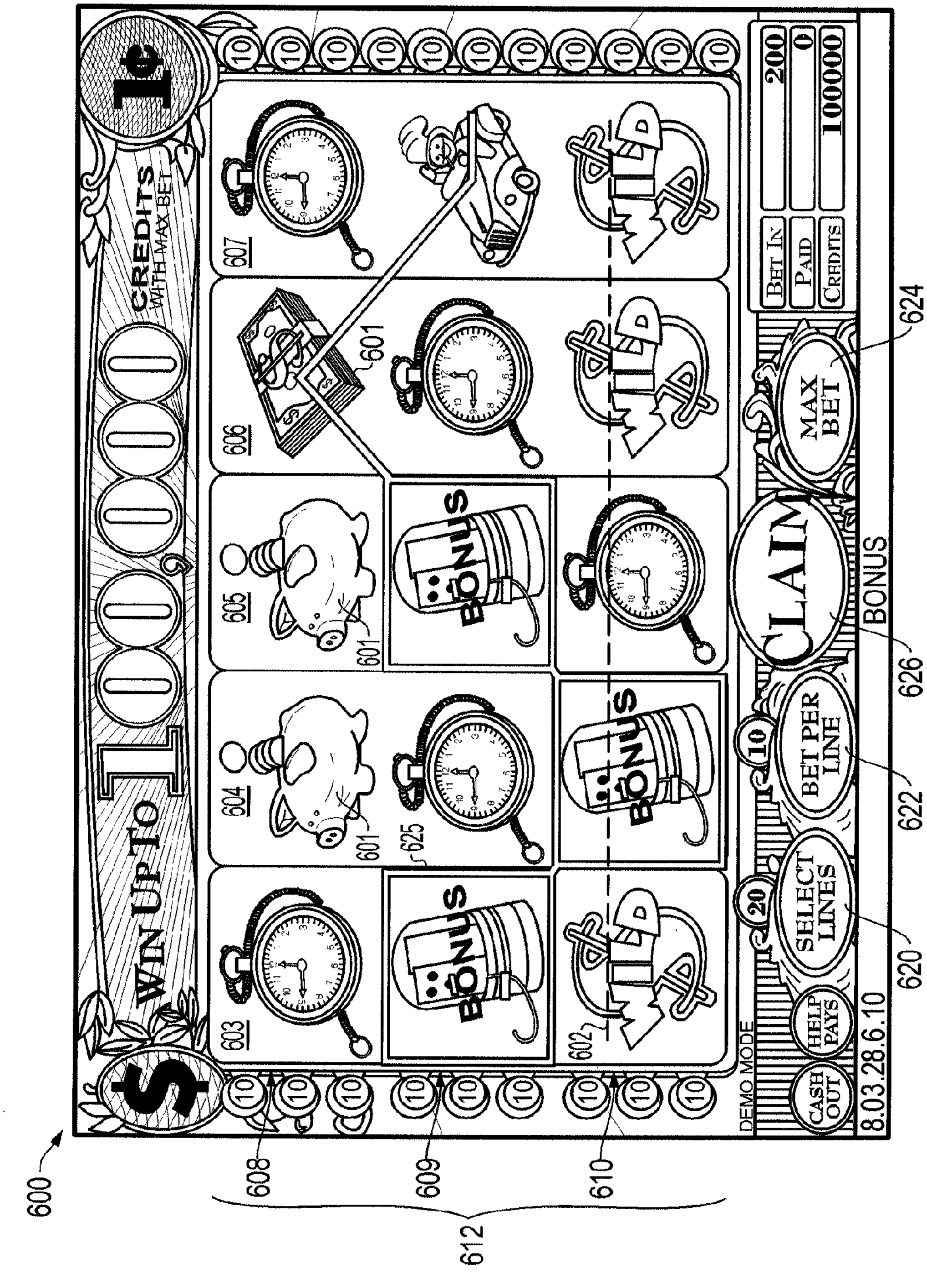
FIG. 6 shows a graphic display having a display matrix and showing a bonus prize pattern.

In a preferred game design, a result for the game play in step 303 is displayed with a matrix of game symbol locations, such as that in the example graphic in FIG. 6. According to this embodiment, the result will be displayed at least partially through a symbol matrix displaying multi-symbol reel simulation results. The display matrix is updated to provide symbol changes according to the reel simulation results. An example of such a reel simulation display is further described with respect to FIG. 6. In one preferred embodiment, a presentation controller located at the gaming machine (such as gaming machine 100 shown in FIGS. 1 and 2) and/or located at a central server or local area server (such as servers 201 and 202, respectively, in FIG. 2), causes a display device to display and change the symbol matrix.

A preferred embodiment selects game results by drawing a random number, which is matched to an outcome prize level. Other embodiments may provide game play by a computerized bingo game with an outcome matched to a certain prize level. Yet another embodiment plays a ticket record having a predetermined outcome. The record may be drawn from record pools on the gaming machine 100 or servers 201 or 202. Any suitable game engine may provide game play. Preferred embodiments display the primary or base game results to the player by spinning simulated reels and stopping the reels at a pattern with a prize having the determined game outcome prize level. One such reel game is further described below.

Next at step 304, the process determines if the game result for this game play cycle is a bonus result. If so, this enters the bonus play mode at step 305. Bonus play is further described below. If the game result is not a bonus result, the process proceeds to step 306, where the result is displayed and the prize is awarded to the player. After this step, the process then goes back to step 302 and another game play cycle begins.

In a preferred design, the steps in FIG. 3 are accomplished by first display state control code that is part of the display control client code resident in program memory of CPU 205.

Figure 4A:
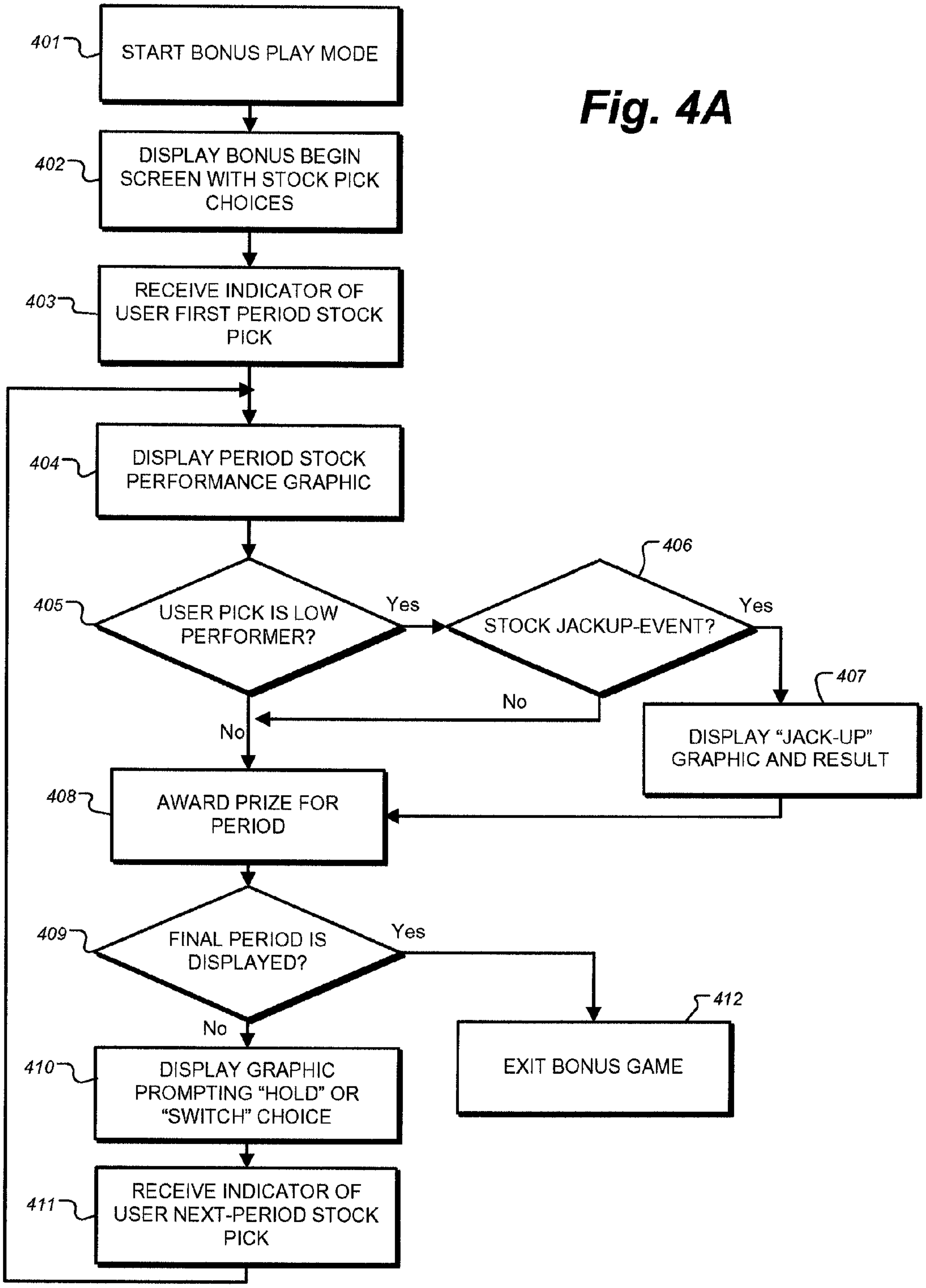
FIG. 4A is a flow chart showing game operation for one bonus play mode.

FIG. 4A is a process flow chart of game play in a bonus play mode. In this embodiment, the process in FIG. 4A is entered from step 305 in FIG. 3, but other sequences may occur. The depicted sequence is that of a preferred game design entitled "Money Man," having a bonus round simulating stock investing with multiple rounds of stock picks by the player. Other variations are possible within the scope of the invention. Step 401 signifies the start of bonus play mode. Next, at step 402, the process displays a beginning stock pick screen, offering choices to the player as to what stock they wish to pick for simulated investment in the first bonus round.

Figure 8:
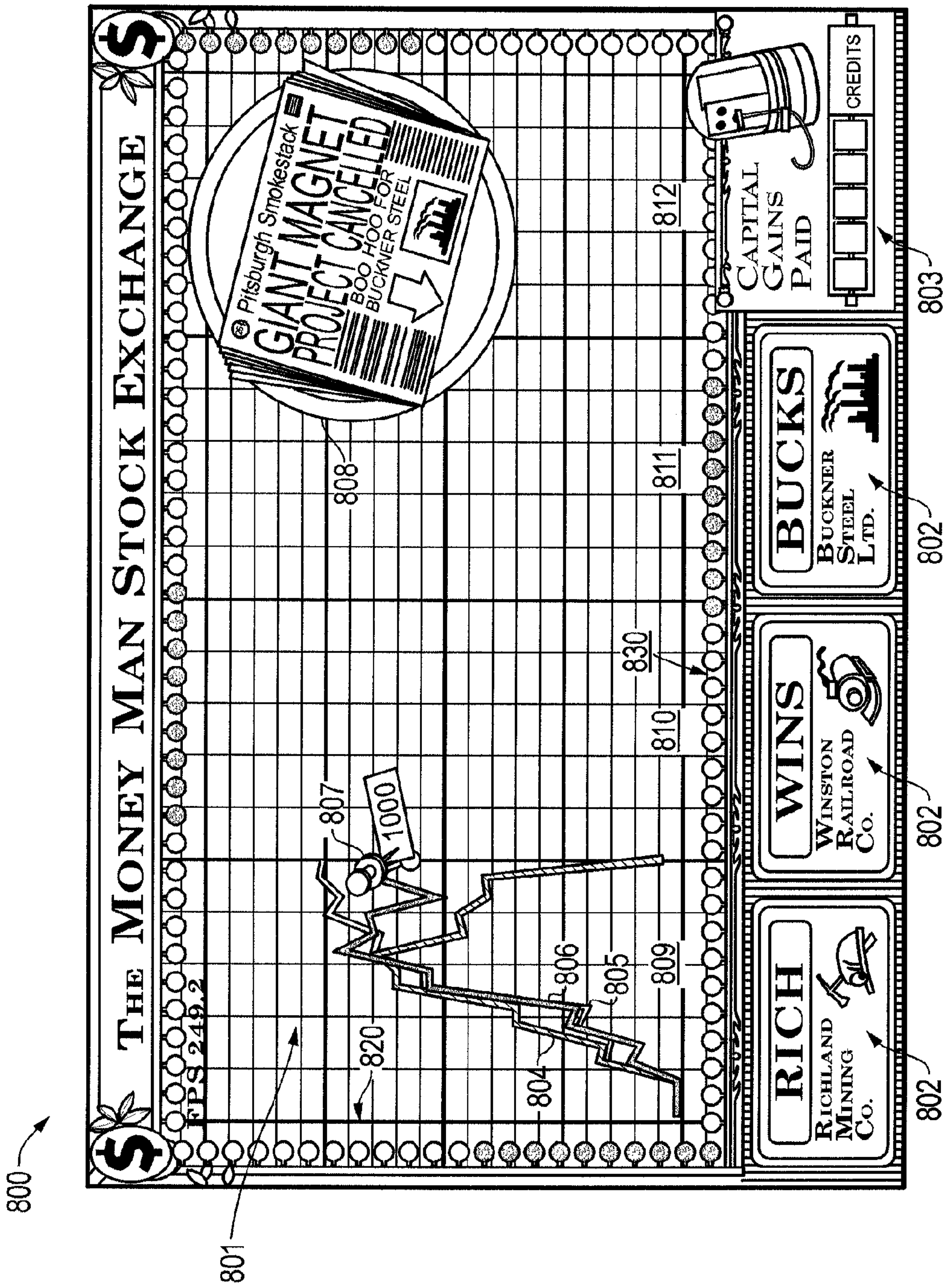
FIG. 8 shows a graphic display showing bonus round market simulation results for the first period of simulation.

Next, at step 403, the process receives an indicator of the player's choice, preferably through a button or touchscreen button. The chosen stock pick is used to provide a simulated stock performance for the current bonus period in step 404. Some or all of the data used in simulation is preferably obtained from an outcome set as further described with respect to FIGS. 5A-B. The simulated performance is preferably shown as a quarterly stock price graph, having colored lines showing the stock pick performance compared to the other possible stock picks. One example of such simulated performance is shown in FIG. 8.

At step 405, the process determines if the player's pick is the low performing stock in the current period. If so, step 406 determines if an adjustment event known as "Jack-Up" will occur. This event raises the displayed performance with a graphic sequence referred to as "Jack-Up The Stock" in stop 407. It should be noted that, in a preferred game, the bonus outcome is determined by selection with a random number, and not by the simulation described herein. Preferably, the simulation is performed by outcome sets chosen to present the random outcome as a series of simulated stock market periods. Therefore, various embodiments may not have a decision flow shown in FIG. 4A. For example, a simulated low performing stock and a "Jack-Up" event may be part of one simulation script, sequence, or outcome set chosen by the game presentation controller to present a certain outcome based on the randomly selected game result. After the "Jack-Up" event, the process proceeds to step 408. If the stock is not a low performer, no "Jack-Up" event is possible in the current period, and the process goes directly from step 405 to step 408.

At step 408, the process awards a prize based on the simulated performance for the current bonus period. At step 409, if the current period is the final period, the process exits the bonus game at step 412 (a preferred game shows four simulated financial quarters of market investment). If the current period is not the final period, such as the example first quarter period simulation result shown in FIG. 8, the process goes from step 409 to step 410.

Figure 9:
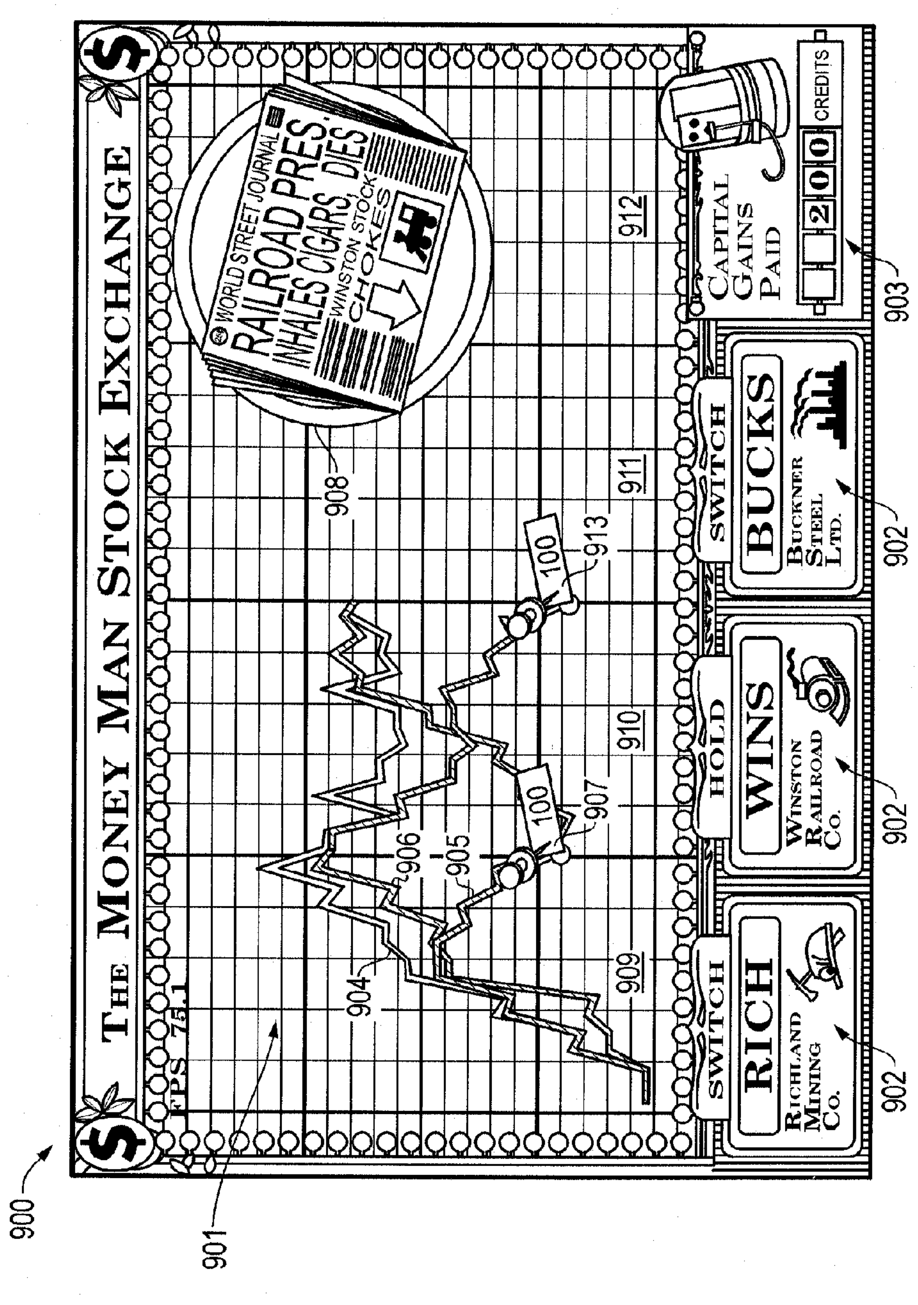
FIG. 9 shows another graphic display prompting a choice to hold or switch the player's chosen stock.

In step 410, the process displays a choice to the user to "Hold" the stock they have currently chosen, or "Switch" to another stock. An example screen depicting this choice is shown in FIG. 9. In step 411, the process receives the player's choice as an indicator of the next period stock pick. Next, the process returns to step 404 where the next period stock performance is simulated and displayed. Note that in a preferred embodiment, the user's choices of stocks in the bonus round do not affect the total bonus round outcome. The choices are provided for entertainment, and are used to choose scripts or other display sequences that display market simulations using the stocks available in the bonus game. Other embodiments may provide games where user choices in the bonus play affects total bonus prize outcome. Such an embodiment may function, for example, by storing outcome sets for each period and each simulated stock, and then providing outcomes for the stock chosen by the user as a prize or prize multiplier. Preferred outcome data sets are further described with respect to FIGS. 5A-B.

In a preferred design, the steps in FIG. 4A are accomplished by second ("bonus mode") display state control code that is part of the display control client code resident in program memory of CPU 205.

Figure 4B:
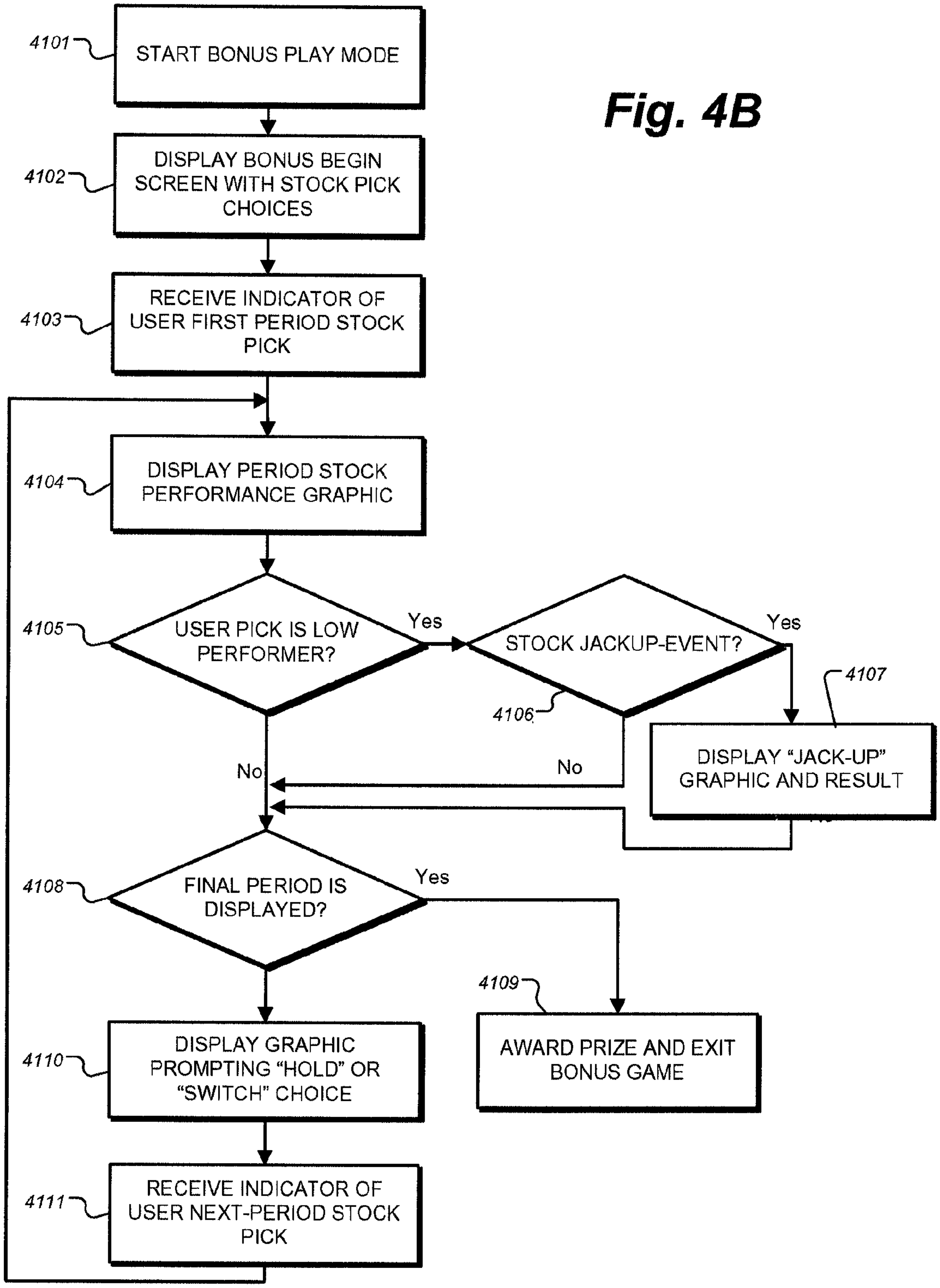
FIG. 4B is a flow chart showing game operation for another bonus play mode.

FIG. 4B is a flow chart of a game play in a bonus play mode according to another embodiment. The process shown is similar to that of FIG. 4A, but does not award a prize at each stock period like step 408 of FIG. 4A. Instead, in the process of FIG. 4B, a single prize is awarded at the end of the bonus simulation (step 4109), based on the player's simulated performance throughout the bonus game.

Figure 5A:
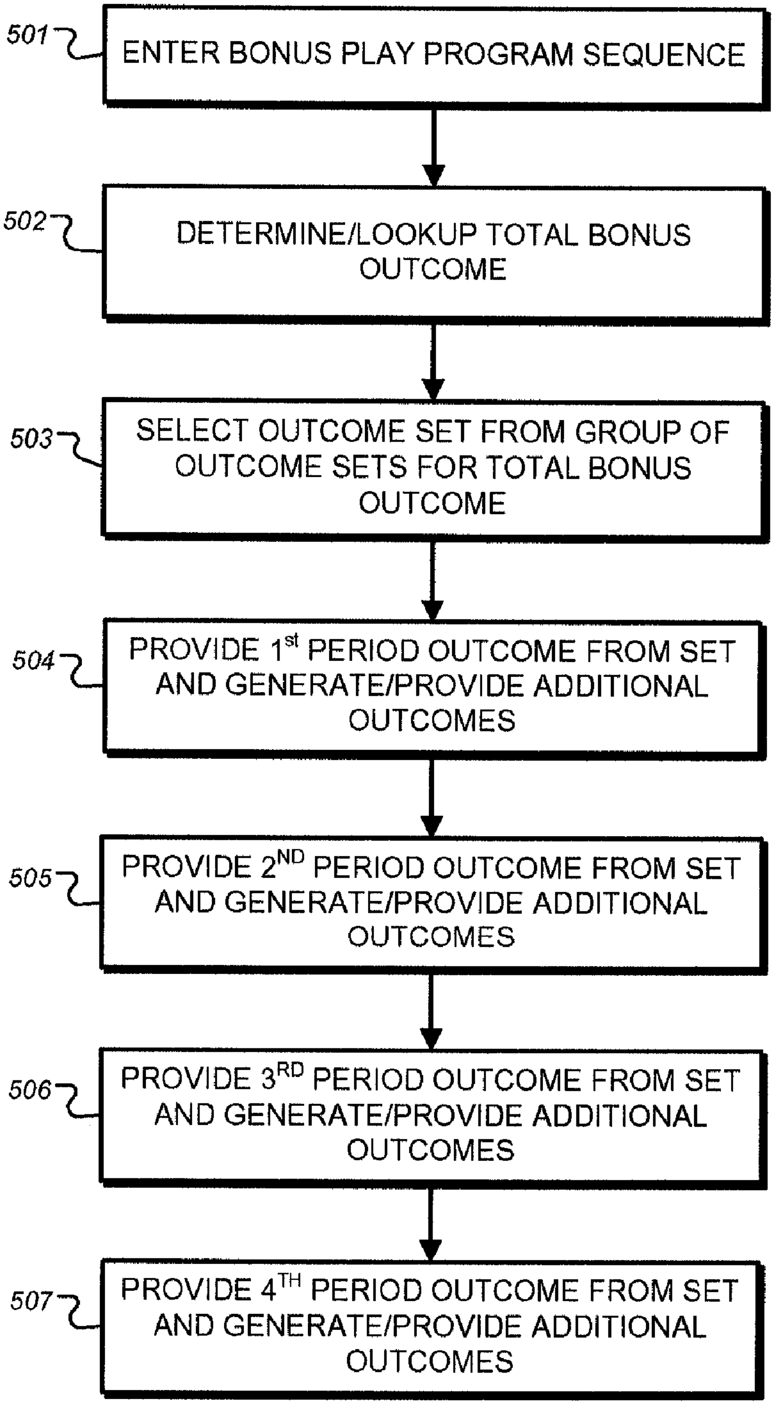
FIG. 5A is a flow chart of a game program sequence for a bonus round according to one embodiment.
Figure 5B:
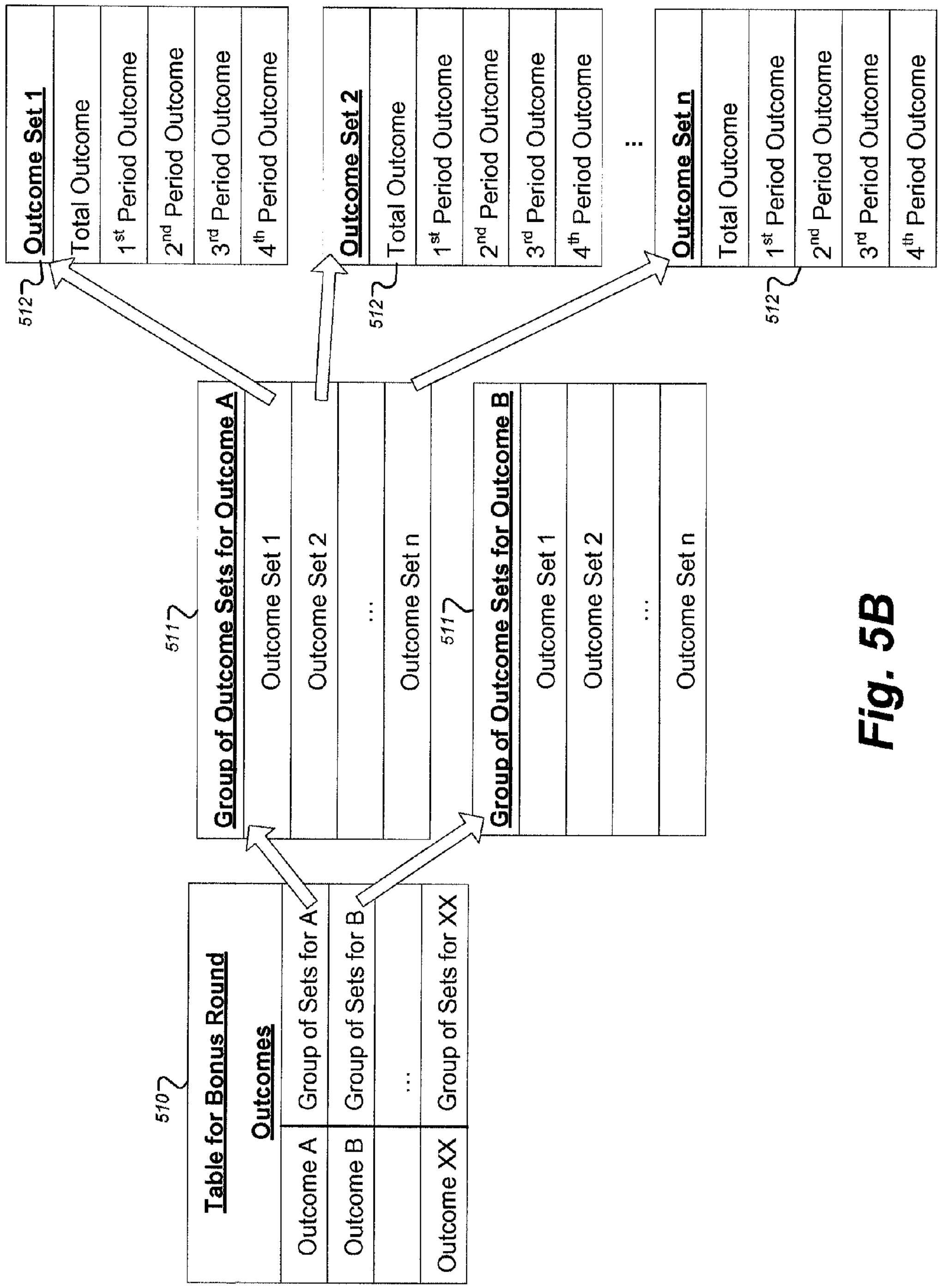
FIG. 5B is a diagram of example data structures for use in the process of FIG. 5A.

FIG. 5A is a flow chart of a game program sequence for a bonus round according to one embodiment. FIG. 5B is a diagram of example data structures for use in the process of FIG. 5A. FIGS. 5A-B illustrate one possible method of providing bonus results for use in the game flow of FIG. 4A-B. The depicted steps herein are preferably accomplished by the presentation controller running bonus mode display state program code as previously described.

Referring to FIGS. 5A and 5B, in step 501 the game machine enters the bonus play mode, which starts the depicted bonus play program sequence. At step 502, the sequence determines or looks up the total bonus outcome to be provided in this instance of the bonus round. This step may occur in a variety of manners. In some embodiments, the total bonus outcome ("bonus outcome" for short) is provided as part of the base game play outcome. For example, a random number may be used to select a game outcome that includes a base game outcome and a bonus outcome. In other embodiments, the bonus outcome may be determined by generating a random number, in addition to any used in play of the base game, and selecting a bonus outcome based on that random number, for example from a bonus prize table. A secondary game play of some type, which may or may not be shown to the player, may also be used to determine a bonus outcome, for example in situations where regulations require the use of a bingo play or electronic lottery ticket records in producing all gaming machine outcomes. In such case, a lottery ticket record may be played, or a bingo game played, the outcome of which is used to select a bonus outcome from a prize table. Other suitable methods of selecting a bonus outcome may also be employed.

Next, at step 503, the program sequence uses the bonus outcome in selecting an outcome set from a group of outcome sets associated with the determined total bonus outcome.

Examples of these data structures are shown in FIG. 5B. As shown there, table 510 is used in step 503 to identify or look up the group of outcome sets needed for the given bonus outcome. This is preferably done based on the value of the bonus outcome. Every possible bonus prize value in the prize table has a group of outcome sets associated with it. For example, an Outcome A may have a 100 credit bonus prize, Outcome B may have a 250 credit bonus prize, and so on, through the entire table 510 to the final Outcome XX, which may have, for example, a 10,000 credit prize. If step 502 provides a bonus outcome of 100 credits, then step 503 looks in table 510 for the group of outcome sets for use to convey the 100 credit outcome (Outcome A in this example). The program sequence must now select a single outcome set from the group of outcome sets 511 for Outcome A. These groups are one way to help provide variety in the simulated stock values each time a similar bonus prize is won. The outcome sets 512 each preferably contain a total bonus outcome record (which may not be specifically stored because it is known already and used in choosing the outcome set), along with four periodic outcome records, one for each period or "quarter" simulated in the preferred game. Of course, different periods may be used. The four period outcome records add up to the total outcome record. Each periodic outcome record is preferably a data point indicating the final price of the stock at the end of that period. The record may also be an array of points indicating the entire price graph during that period. Thus, an outcome set 512 represents the simulated outcome result for the player's chosen stock in each of the four simulated quarters. Any particular outcome record may contain a flag or other designation to indicate a Jack-Up modification event occurs during that period. Alternatively, a Jack-Up modification event may be designated by a separate record stored in the outcome set, or may be randomly designated for a certain percentage of simulated periods.

Note that the data structures 510, 511, and 512 shown in FIG. 5B may be implemented in any way suitable for access by the program code. For example, one or more database tables may be used. Data files or other data structures may also be used.

Selecting the outcome set 512 from the group 511 may be accomplished in a number of ways. One way to select the outcome set 512 is to simply cycle through the group 511 in order from 1 to n, the total number of outcome sets in the group, for each successive time the group 512 is accessed. (The number n may vary between outcome sets. For example, less frequent outcomes such as the larger bonus prizes may have a smaller n.) Another way is to generate a random number and use it as a scaled index to select a set 512 from the group 511. Another way is to use a random number or game outcome already available in the game to index the group 511. For example, where the base game uses a random number or lottery ticket record to determine the game outcome from a prize table, that same random number or lottery ticket record may be used to index the group 511 and select the set 512. Any suitable method of choosing the set 512 from the group 511 may be used, as long as it provides sufficient perceived variation to the player.

After step 503, the outcomes for each simulated period of the bonus round are known, and are ready to be provided for display to the player in response to the player's stock pick (for example, step 403 in FIG. 4A). Next at step 504, the program sequence provides the $1^{st}$ period outcome record for use in the stock simulation display of the first quarter. In the preferred game this is done responsive to receiving an indication of a first-period player simulated stock pick (step 403, FIG. 4A, for example.) Step 504 also generates at least one additional first period outcome data point for use in simulating performance of the one or more non-selected stock picks. This may be randomly generated or selected from other data records included in the outcome set. The data is used in displaying the simulated stock performance compared to non-selected stock picks (FIG. 4A, for example). Note that the display process may include a "Jack-Up" modification event, but the value after the event will be the period outcome supplied in step 503. In steps 505, 506, and 507, this process is repeated for each simulated period (preferably, a financial quarter), until the bonus game ends.

FIG. 6 shows a representation of a graphic display 600 showing a reel-type game primary play screen, with a bonus activation pattern displayed. The graphic display shown in FIG. 6 is a video reel-type display that includes a number of reel symbols 601. Such a graphic display may be generated on a video display device such as secondary video display device 107 shown in FIGS. 1 and 2 in connection with example gaming machine 100. Preferred embodiments provide random game results by selecting a random number which indicates a total prize be awarded from the prize distribution. The reel stop pattern is then selected to match that prize. Therefore, reel simulators in this embodiment simulate rotation and then display the pattern matched to the selected number. Preferably, certain high-prize results are mapped to bonus patterns such as the depicted boxed pattern 625, and the game awards the prize during the bonus round.

The preferred game design herein, "Money Man," is a 5-reel, 20-line game with multiple pay opportunities, animated reel symbols, and a second screen Stock Market bonus game. This game is based loosely on 1940's-era imagery. The title character appears in some graphic sequences as a man with money and the trappings of wealth: yacht, safe full of money, dollar-bill bow tie, diamonds, gold pocket watch, etc. The player may bet between 1-200 credits among 20 lines.

The reel symbols 601 in FIG. 6 are provided in symbol locations arranged vertically in columns 603, 604, 605, 606 and 607. Each column, in the display matrix state depicted here, simulates a spinnable reel such as the mechanical reel on a mechanical reel-type machine (slot machine). The reel symbols are also arranged in horizontal rows 608, 609 and 610. This combination of columns and rows represents a display matrix 612 of symbol locations. As shown in FIG. 6, display matrix 612 is created by the combination of five columns and three rows of reel symbols 601, each occupying a symbol location, for example only and not by limitation. Preferably, the simulated reels are aligned so that they spin about a common axis of rotation.

In the depicted preferred game, the game result has produced a bonus pattern of three stock ticker symbols. This is merely an example preferred bonus award event and other suitable patterns or other game events may be employed as bonus award events.

A game play is initiated typically through a player game activation at gaming machine 100. The depicted game result shown graphic display 600 is produced by first causing the five simulated reels defined by columns 603, 604, 605, 606 and 607 to appear to spin and then come to rest with a particular set of reel symbols 601 and/or blanks lined up along one or more paylines 602 defined through the display matrix 612. The reel symbols 601 that line up along the payline(s) indicate the result for the game play. A payline may be defined in any manner including two or more symbols as known in the art. The depicted payline 602 is shown with a dotted line for example only, the dotted line not typically being part of the game. A given result can also be displayed by "scatter" symbols displayed anywhere in display matrix 612 and not necessarily in any line or set relationship.

In addition to display matrix 612, the video device used to generate the graphic display image also provides additional graphic elements around the periphery of the display matrix. A "Claim" button 626 is shown in the central lower part of the screen to claim the bonus and start the bonus round. The "Play" button is in this position in normal, non-bonus playing. "Select Lines," "Bet Per Line," and "Max Bet" buttons 620, 622, and 624, respectively, may also be invoked to choose a bet level in the process of initiating a game play at the gaming machine employing graphic display 600. FIG. 6 also shows other player control touch screen buttons/icons "Cash Out" and "Help Pays" to invoke other common functions available in gaming machine 100 and other types of gaming machines.

The display matrix 612 includes, in this preferred embodiment, multi-symbol reel representations. This means the columns 603-607 are, in one embodiment, each linked to a single respective multi-symbol reel simulator. The vertical combination of symbols in column 603, for example, includes three adjacent symbols on a multi-symbol simulated reel. This is not limiting, however, and the bonus schemes described herein may be employed in games with uni-symbol reels or non-reel games.

Figure 7:
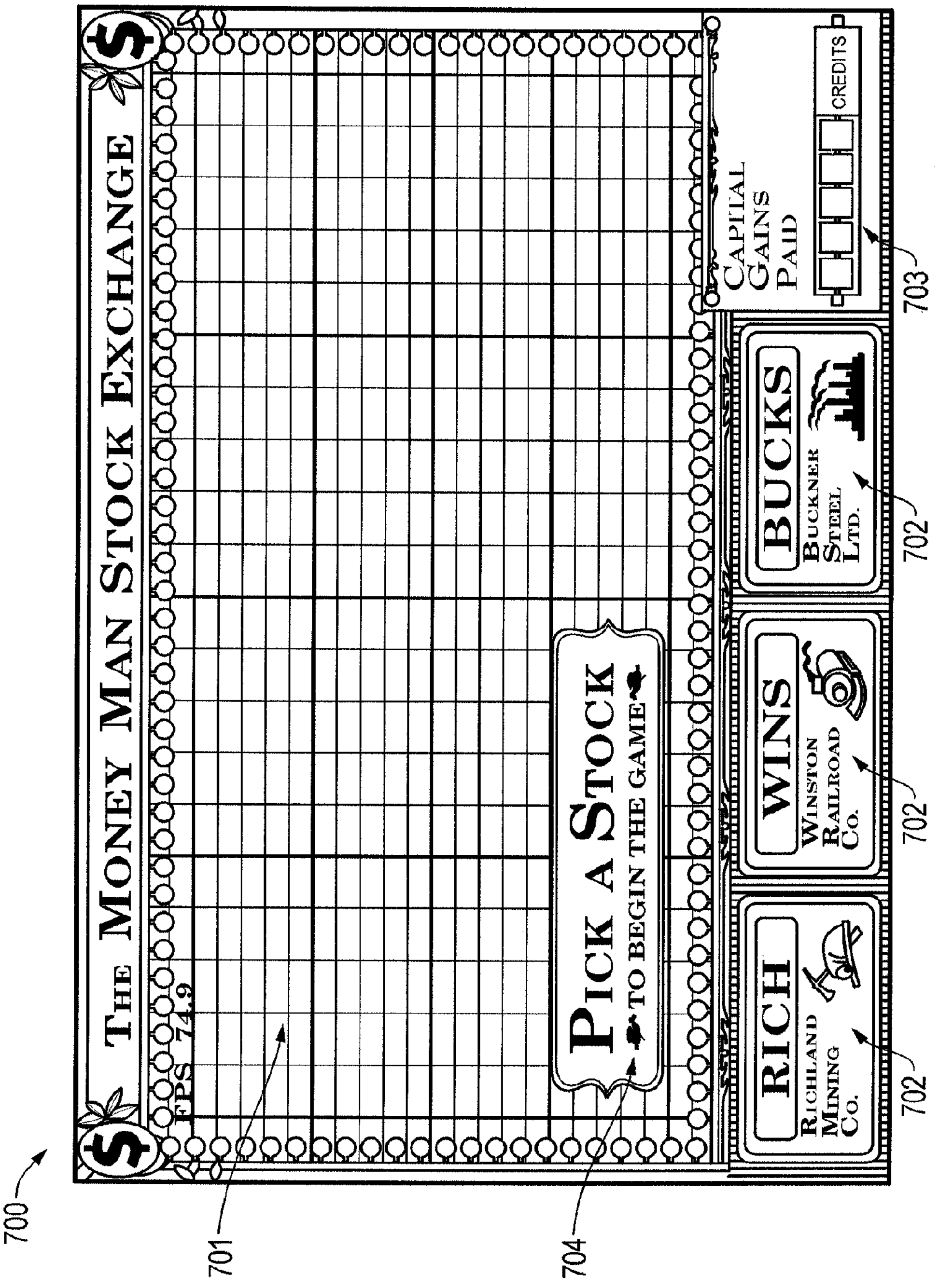
FIG. 7 shows a graphic display shown at the start of a bonus game.

FIG. 7 shows a representation of a graphic display 700 shown at the start of a bonus game. The display 700 has a graph area 701 in which simulated stock performance graphs will be shown. At this point, graph area 701 is empty. Also displayed is a prompt 704 telling the player to pick a stock to begin the bonus game. Along the lower side of area 701 are stock pick buttons 702, each labeled with the name of a simulated stock for the player to choose. Preferably, the player activates a single stock pick button 702, choosing a single stock for simulation for the first simulated stock market quarter. Upon activating one of the stock pick buttons 702, the game proceeds to simulate stock performance for the first period, such as in the example result shown in FIG. 8. A simulated capital gains indicator 703 shows the player's gains based on the simulated performance.

In a preferred game, three stock pick buttons 702 are shown, but more fake stocks may be used in any particular game. The stock picks used in the preferred game herein are shown below in Table 1.

TABLE 1

"Money Man" Stock Picks

| Company | Ticker Symbol |
|---|---|
| Richland Mining Co. | RICH |
| Buckner Steel Ltd. | BUCKS |
| Winston Railroad Co. | WINS |

FIG. 8 shows a representation of a graphic display 800 showing bonus round market simulation results for the first period. The vertical axis 820 of the depicted graph area 801 corresponds to stock price, and the horizontal axis 830 to time. The time scale in the preferred game has four quarters 809, 810, 811, and 812. A simulated newspaper headline 808 may appear providing news regarding one of the three companies. A simulated capital gains indicator 803 shows the player's gains based on the simulated performance.

Depicted in graph area 801 are three simulated stock price graphs 804, 805, and 806. In a preferred game the graph lines are colored to match their respective stock pick buttons 802. Preferably, the graphs are drawn slowly to simulate stock price movement over time, on an accelerated scale of course. Once the player chooses one of the stocks, the lines representing the individual color-coded stocks will begin to move across the screen. The display includes player pick performance symbol 807 to mark the player's stock pick. Preferably, all stocks will start at the same price, which represents the minimum bonus multiplier to be applied to calculate the total bonus prize. Other embodiments may provide a stock price directly matched to the number of credits to be awarded as the bonus prize.

The depicted graphs are preferably generated using outcome sets as described above with regard to FIGS. 5A-B. In some embodiments, the outcome set contains only the final price of the player stock pick for each period. (In the displayed example, the final price is 1000 for the first period.) Some embodiments, as explained, have outcome data points for each stock price. Preferably, the bonus mode display state program code randomly generates the remaining graph data connecting the period start price with the period final price for all three simulated stock graphs. Other embodiments may store the entire graph data in the outcome set for either the player stock pick or all three simulated stock graphs.

A feature may also be provided to skip the simulation and provide the complete bonus result. In such case, the result is provided independently of the player interruption of the respective period bonus result graphic sequence.

FIG. 9 shows another graphic display 900 prompting a choice to hold or switch the player's chosen stock. In the "Money Man" game design herein, once the simulated graphs start moving across the screen for a given quarter, a newspaper headline 908 will appear somewhere on the screen that will have an effect on one of the stocks, positive or negative. The effected stock will end up as either the highest of the 3 (if there was a positive headline) or the lowest (if there was a negative headline). The lines will then continue to the end of quarter line and stop. At the end of the quarter, the player will have a chance to either hold the stock he initially picked, or switch to one of the other stocks. The word "hold" appears on the currently chosen stock pick button, and "switch" on the other two stock pick buttons. The selection may also be presented as an ongoing choice during the simulated quarter. After this selection, the lines will once again move and the player will see another headline impacting a stock. The same happens when the lines stop at the $2^{nd}$ and $3^{rd}$ Quarters. The stock lines will finish out to the $4^{th}$ Quarter line and reflect the total amount won, expressed as credits. The player will then transition back to the $1^{st}$ screen to resume play.

Figure 10:
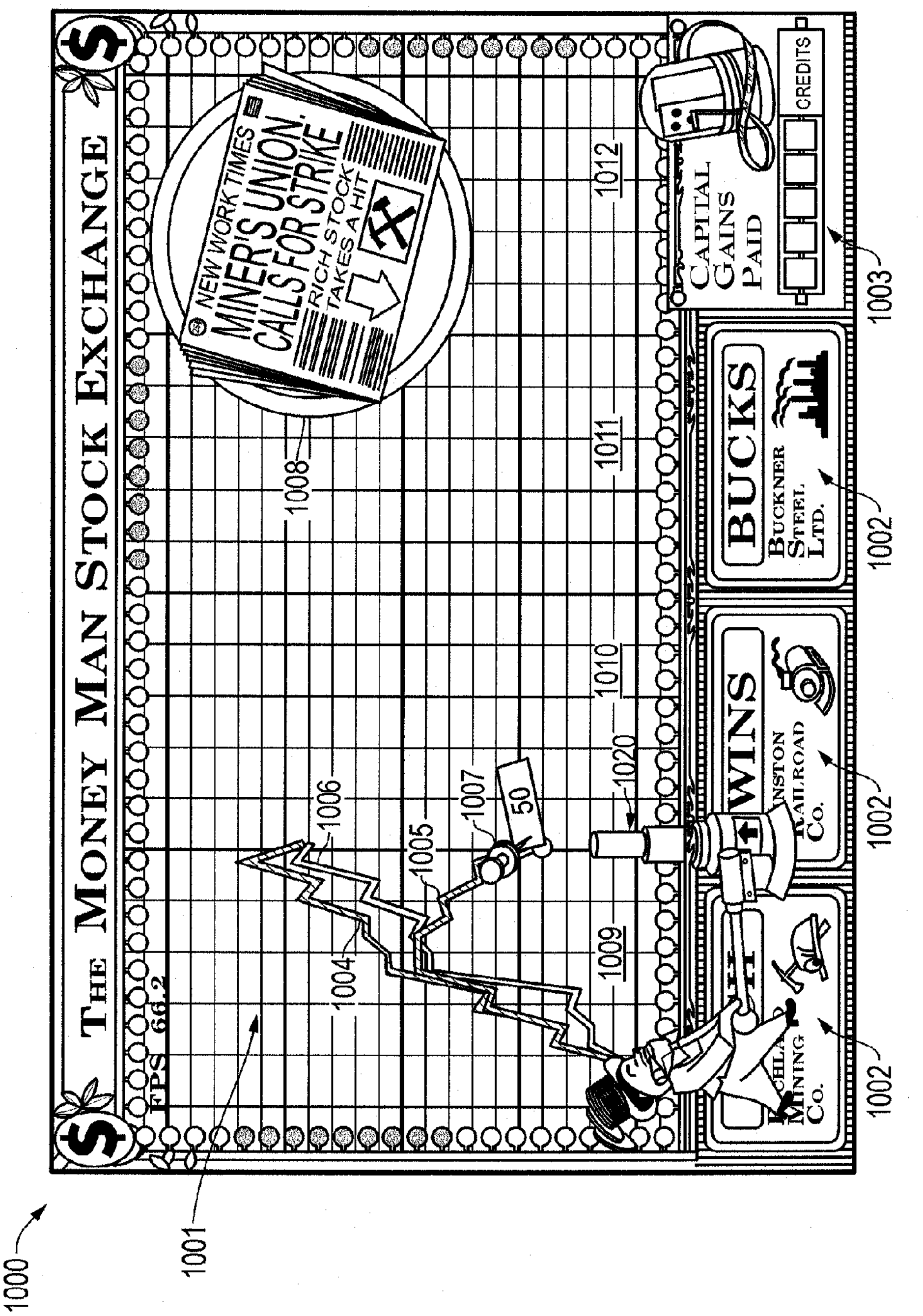
FIG. 10 shows another graphic display with a stock "Jack-Up" sequence that modifies depicted simulation results.

FIG. 10 shows another graphic display 1000 showing a stock "Jack-Up" modification sequence. The depicted time scale again has four quarters 1009, 1010, 1011, and 1012. Depicted in graph area 1001 are three simulated stock prize graphs 1004, 1005, and 1006. A simulated newspaper headline 1008 has appeared during the simulation with bad news regarding the user's stock pick, Richland Mining Co., which is graph 1005.

In the preferred game design, approximately once in every 6.5 turns in which the player chooses a stock that gets a negative headline, the simulation initially displays the prize value at one-half its actual amount. At that point, a "Jack Up" modification graphic sequence is displayed in which the Money Man character will appear and run along the bottom of the graph, place a jack 1020 under the end of that quarter, and begin to pump. The jack will raise the stock value indicator 1007 until it reaches the displayed value, and then push it up to its actual award value. This will be known as "jacking up the price of the stock."

Figure 11:
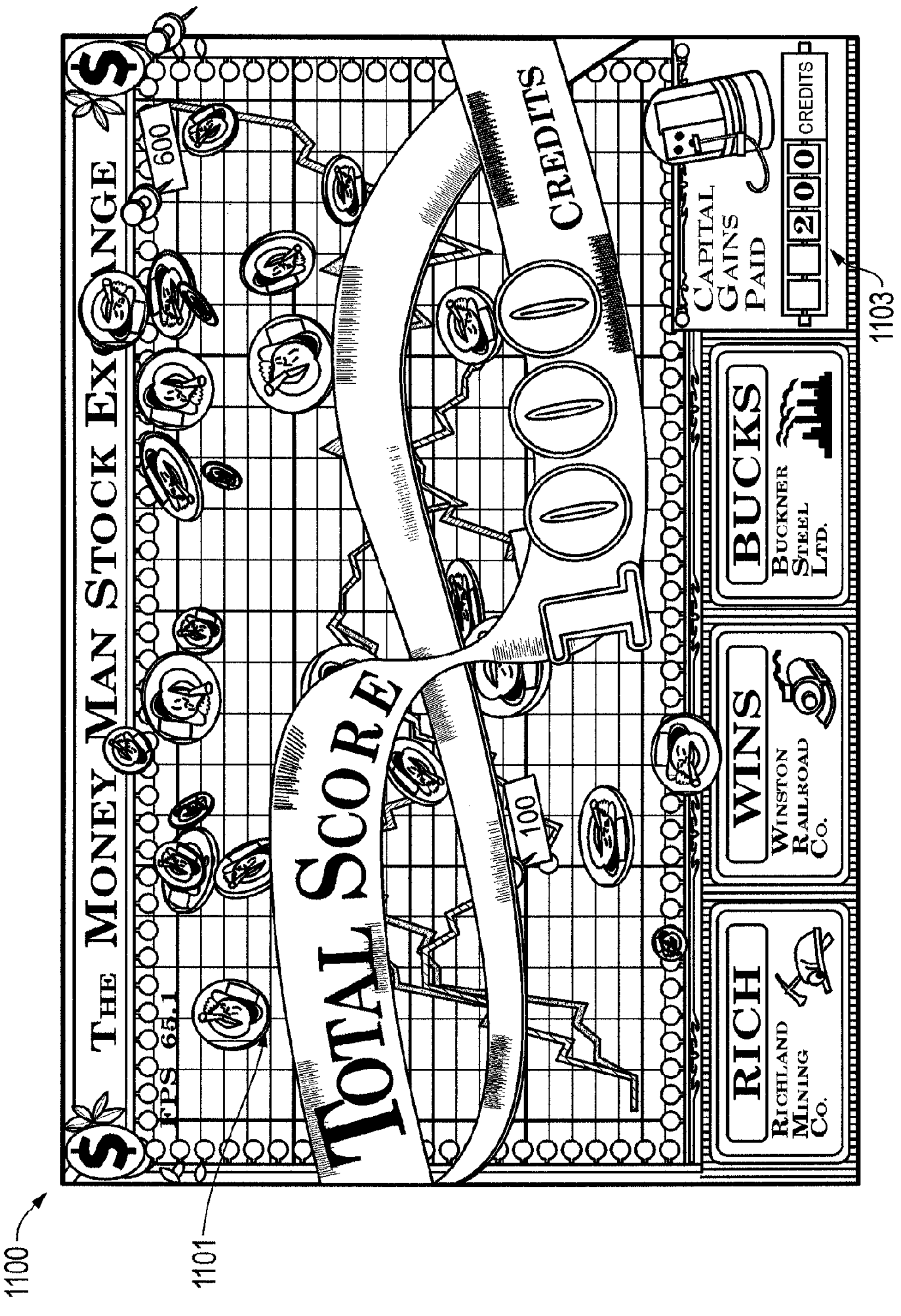
FIG. 11 shows another graphic display shown at the end of a bonus round.

FIG. 11 shows another graphic display 1100 displayed at the end of a bonus round. The graph area 1101 is covered by a score banner and falling coin graphics, and the capital gains indicator 1103 shows the total credits awarded in the bonus round. Following this screen the game returns back to the regular game screen, such as that depicted in FIG. 6.

It should be noted that the invention is not limited to gaming machines employing the personal computer-type arrangement of processing devices and interfaces shown in example gaming machine 100. Other gaming machines may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is only necessary that the gaming machine include one display device that is capable of displaying the effects described herein. For example, a gaming machine suitable for use in the invention may include a mechanical reel-type display rather than a video-type display device for displaying results in a primary game. Thus, a gaming machine suitable for use in the present invention may have a structure similar to that shown for gaming machine 100 in FIG. 1, but with a mechanical reel-type display replacing primary video display device 104.

As used herein, the terms "comprising," "including," "carrying," "having," "containing," "involving," and the like are to be understood to be open-ended, that is, to mean including but not limited to.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A program product embodied in one or more non-transitory computer readable media, the program product including:

(a) first display state program code executable to cause a gaming machine to operate in a first display state in which (i) a matrix of symbol locations is displayed by two or more reel representations aligned along a common axis of rotation, each reel representation displaying at least two adjacent symbol locations of the matrix of symbol locations, and each symbol location displaying a respective reel symbol, and in which (ii) the rotation of each reel representation is simulated to change the symbols displayed by the matrix of symbol locations;

(b) second display state program code executable to cause the gaming machine to operate in a second display state in which: (i) a simulated stock market graph area is shown, the simulated stock market graph area for showing simulated stock performance on a graph with a vertical axis indicating stock price and a horizontal axis indicating time, (ii) a simulated stock price for a player stock pick is shown on the graph area, (iii) a simulated stock price for at least one non-selected stock pick is shown on the graph area; (iv) another graphic sequence is shown; the another graphic sequence simulating modifying the first-period or final-period simulated stock performance, the graphic sequence being displayed at least partially in an animated, non-graph format; and (v) a modification of the simulated stock price for either the player stock pick or the at least one non-selected stock pick is shown within the simulated stock market graph area based on the shown another graphic sequence; and (c) display state control program code executable to cause the gaming machine to switch from the first display state to the second display state in response to a trigger event.

2. The program product of claim 1 wherein the second display state program code is further executable to cause the gaming machine to award an intermediate prize related to the simulated stock price for the player stock pick.

3. The program product of claim 1, in which the second display state program code is further executable to cause the gaming machine to operate in the second display state in which the video display device displays a mid-bonus game pick screen prompting player mid-bonus selection from a hold stock pick and one or more switch stock picks, and, responsive to receiving a mid-bonus selection indicator of a mid-bonus player stock pick, the second display state program code is further executable to cause the video display device to display a final-period bonus result graphic sequence showing the simulated stock market graph area, the final-period bonus result graphic sequence displaying a final-period simulated stock performance of the mid-bonus player stock pick.

4. The program product of claim 1 in which the first-period bonus result graphic sequence and the final-period bonus result graphic sequence are both adapted to provide a respective outcome, determined before the start of the respective period bonus result graphic sequence, independently of any player interruption of the respective period bonus result graphic sequence.

5. The program product of claim 1 wherein the second display state program code is further executable to cause the gaming machine to:

(a) select an outcome set from a group of outcome sets associated with a predetermined total bonus round outcome; and (b) responsive to receiving an indication of a first-period player simulated stock pick, provide at least one first-period outcome data point from the selected outcome set for use in simulating performance of a player stock pick, and generate at least one additional first period outcome data point for use in simulating performance of the one or more non-selected stock picks.

6. A gaming machine including:

(a) a video display device;

(b) a player interface; and (c) a presentation controller, the presentation controller for: (i) causing the video display device to display a bonus game pick screen prompting player selection of a simulated stock pick from among two or more stock selection display regions, (ii) responsive to receiving an indication of a simulated stock pick, causing the video display device to display a first-period bonus result graphic sequence showing a simulated stock market graph area for showing simulated stock performance on a graph with a vertical axis indicating stock price and a horizontal axis indicating time, the first-period bonus result graphic sequence displaying a first-period simulated stock performance of the simulated player stock pick relative to one or more non-selected stock picks, (iii) causing the video display device to display a mid-bonus game pick screen prompting player mid-bonus selection from a hold stock pick and one or more switch stock picks, (iv) responsive to receiving a mid-bonus selection indicator of a mid-bonus player stock pick, causing the video display device to display a final-period bonus result graphic sequence showing the simulated stock market graph area, the final-period bonus result graphic sequence displaying a final-period simulated stock performance of the mid-bonus player stock pick relative to one or more non-selected stock picks, (v) displaying another graphic sequence simulating modifying the first-period or final-period simulated stock performance, the graphic sequence being displayed at least partially in an animated, non-graph format, (vi) modifying the first-period or final-period simulated stock performance within the simulated stock market graph area based on the displayed another graphic sequence, and (vii) causing a bonus prize related to the final period simulated stock performance to be awarded.

7. The gaming machine of claim 6 wherein the presentation controller is further for awarding an intermediate prize after displaying a first-period bonus result graphic sequence.

8. The gaming machine of claim 6 wherein the presentation controller is further for:

(a) displaying a second-period bonus game pick screen prompting player second-period selection from a hold stock pick and one or more switch stock picks; and (b) in response to receiving a second-period selection indicator of a second-period player stock pick, displaying a second-period bonus result graphic sequence showing the simulated stock market graph area, the second-period bonus result graphic sequence displaying a second-period simulated stock performance of the second-period player stock pick relative to one or more non-selected stock picks.

9. The gaming machine of claim 8 wherein the presentation controller is further for awarding an intermediate prize after displaying a second-period bonus result graphic sequence.

10. The gaming machine of claim 6 in which the first-period bonus result graphic sequence and the final-period bonus result graphic sequence are both adapted to provide a respective outcome, determined before the start of the respective period bonus result graphic sequence, independently of any player interruption of the respective period bonus result graphic sequence.

11. The gaming machine of claim 6 wherein the presentation controller is further for:

(a) selecting an outcome set from a group of outcome sets associated with a predetermined total bonus round outcome; and (b) responsive to receiving an indication of a first-period player simulated stock pick, providing at least one first-period outcome data point from the selected outcome set for use in simulating performance of a player stock pick, and generating at least one additional first period outcome data point for use in simulating performance of the one or more non-selected stock picks.

12. A method comprising:

(a) receiving a wager indication from a player;

(b) displaying a matrix of symbol locations, the matrix of symbol locations being displayed by two or more reel representations each displaying one or more adjacent symbol locations of the matrix of symbol locations, and each symbol location displaying a respective reel symbol;

(c) responsive to a game activation, simulating the rotation of each reel representation to change the symbols displayed by the matrix of symbol locations;

(d) responsive to a bonus trigger event having a result displayed in the matrix of symbol locations, displaying a bonus game pick screen prompting player selection of a simulated stock pick;

(e) responsive to receiving an indication of a first-period player simulated stock pick, displaying a first-period bonus result graphic sequence showing a simulated stock market graph area for showing simulated stock performance on a graph with a vertical axis indicating stock price and a horizontal axis indicating time, the first-period bonus result graphic sequence displaying a first-period simulated stock performance of the simulated player stock pick relative to one or more non-selected stock picks;

(f) displaying a mid-bonus game pick screen prompting player mid-bonus selection of one of a hold stock pick and one or more switch stock picks;

(g) in response to receiving a mid-bonus selection indicator of a mid-bonus player stock pick, displaying a final-period bonus result graphic sequence showing the simulated stock market graph area, the final-period bonus result graphic sequence displaying a final-period simulated stock performance of the mid-bonus player stock pick relative to one or more non-selected stock picks;

(h) displaying another graphic sequence simulating modifying the first-period or final-period simulated stock performance, the graphic sequence being displayed at least partially in an animated, non-graph format;

(i) modifying the first-period or final-period simulated stock performance within the simulated stock market graph area based on the displayed another graphic sequence; and (j) awarding the player a bonus prize related to the final period simulated stock performance.

13. The method of claim 12 further comprising awarding an intermediate prize after displaying a first-period bonus result graphic sequence.

14. The method of claim 12 further comprising:

(a) displaying a second-period bonus game pick screen prompting player second-period selection from a hold stock pick and one or more switch stock picks; and (b) in response to receiving a second-period selection indicator of a second-period player stock pick, displaying a second-period bonus result graphic sequence in the simulated stock market graph area, the second-period bonus result graphic sequence showing a second-period simulated stock performance of the second-period player stock pick relative to one or more non-selected stock picks.

15. The method of claim 14 further comprising awarding an intermediate prize after displaying a second-period bonus result graphic sequence.

16. The method of claim 12 in which the first-period bonus result graphic sequence and the final-period bonus result graphic sequence both provide a respective outcome, determined before the start of the respective period bonus result graphic sequence, independently of any player interruption of the respective period bonus result graphic sequence.

17. The method of claim 12 further comprising:

(a) selecting an outcome set from a group of outcome sets associated with a predetermined total bonus round outcome; and (b) responsive to receiving an indication of a first-period player simulated stock pick, providing at least one first-period outcome data point from the selected outcome set for use in simulating performance of a player stock pick, and generating at least one additional first period outcome data point for use in simulating performance of the one or more non-selected stock picks.

* * * * *